United States Patent [19]
Kim et al.

[11] Patent Number: 6,128,292
[45] Date of Patent: Oct. 3, 2000

[54] PACKET SWITCHING APPARATUS WITH MULTI-CHANNEL AND MULTI-CAST SWITCHING FUNCTIONS AND PACKET SWITCHING SYSTEM USING THE SAME

[75] Inventors: Keun-Bae Kim, Daejeon, Rep. of Korea; Paul S. Min; Peter Y. Yan, both of St. Louis, Mich.

[73] Assignees: Electronics and Telecommunications Research Institute, Daejeon, Rep. of Korea; Washington University, St. Louis, Mo.

[21] Appl. No.: 08/985,489

[22] Filed: Dec. 4, 1997

[30] Foreign Application Priority Data

Dec. 5, 1996 [KR] Rep. of Korea ..................... 96-62143

[51] Int. Cl.$^7$ .................................................. H04L 12/66
[52] U.S. Cl. .......................................... 370/356; 370/389
[58] Field of Search .................................... 370/390, 389, 370/392, 395, 398, 399, 411, 356, 418, 355, 396

[56] References Cited

U.S. PATENT DOCUMENTS

| | | | |
|---|---|---|---|
| 4,813,038 | 3/1989 | Lee | 370/60 |
| 5,124,978 | 6/1992 | Chao | 370/60 |
| 5,179,552 | 1/1993 | Chao | 370/60 |
| 5,440,549 | 8/1995 | Min et al. | 370/60 |
| 5,526,352 | 6/1996 | Min et al. | 370/60 |
| 5,636,210 | 6/1997 | Agrawal | 370/390 |
| 5,724,351 | 3/1998 | Chao et al. | 370/395 |

OTHER PUBLICATIONS

"Multichannel Bandwidth Allocation in a Broadband Packet Switch", Achille Pattavina, *IEEE Journal on Selected Areas in Communications*, vol. 6, No. 9, Dec. 1988, pp. 1489–1499.

"Multicast Routing in 3–Stage Clos ATM Switching Networks" Soung C. Liew, Senior Member, IEEE, *IEEE Transactions on Communications*, vol. 42, No. 2/3/4. Feb./Mar./Apr. 1994, pp. 1380–1390.

"Design and Analysis of a Multilink Access Subsystem Based on the Batcher–Banyan Network Architecture", Peter S. Y. Lau, Member, IEEE, and Alberto Leon–Garcia, Member IEEE, *IEEE Transactions on Communications*, vol. 40, No. 11. Nov. 1992, pp. 1757–1766.

(List continued on next page.)

*Primary Examiner*—Valencia Martin-Wallace
*Assistant Examiner*—Kim T. Nguyen
*Attorney, Agent, or Firm*—Cohen, Pontani, Lieberman & Pavane

[57] ABSTRACT

An improved packet switching apparatus with multichannel and multi-cast switching functions and a packet switching system using the same which are capable of more simplifying the routing of an internal routing during the integration of the switching apparatus by using a simpler 2×2 switch device for a concentration network in order to provide a routing network and a recirculation path and by using a pattern connection characteristic consisting of a column and row. The apparatus includes an output group address generator for providing an address information of an output port grouped, a routing unit for receiving a cell which is recirculated through a recirculation path and a newly inputted cell, assigning an output link with respect to the recirculated cell when an output port-dependent address inputted from the output group address generator and a destination address set in a routing tag of a cell inputted by the port are identical, and outputting the cells which was not assigned of the output link through a plurality of bypass links, a recirculation path setting unit for selecting a cell as many as the number of circulation paths among cells outputted from the routing unit through the plurality of the bypass links and for outputting the cells through the recirculation link, and a synchronization unit for receiving a cell which is recirculated from the recirculation path setting unit through the recirculation link.

11 Claims, 11 Drawing Sheets

OTHER PUBLICATIONS

"A Nonblocking Architecture for Broadband Multichannel Switching", P.S. Min, Member, IEEE, H. Saidi. and M.V. Hegde, Member, IEEE, *IEEE Transactions on Communications*, vol. 3, No. 2. Apr. 1995, pp. 181–198.

"Multichannel ATM Switch with Preserved Packet Sequence", Hyong. S. Kim, *Department of Electrical and Computer Engineering Carnegie Mellon University*, pp. 1634–1638.

"A Recursive Modular Terabit/Second ATM Switch", H. Jonathan Chao, Member IEEE, *IEEE Selected Areas in Communications*, vol. 9, No. 8. Oct. 1991, pp. 1161–1172.

"Nonblocking Copy Networks for Multicast Packet Switching", Tony T. Lee, *IEEE Selected Areas in Communications*, vol. 6, No. 9. Dec. 1988 , pp. 1455–1467. Copyright© 1988 by the Institute of Electrical and Electronics Engineering, Inc.pp. 327–339.

PACKET SWITCHING APPARATUS WITH MULTI-CHANNEL AND MULTI-CAST SWITCHING FUNCTIONS AND PACKET SWITCHING SYSTEM USING THE SAME

BACKGROUND OF THE INVENTION

1. Field of the Invention

The present invention relates to a packet switching apparatus with multi-channel and multi-cast switching functions and a packet switching system using the same, and particularly, to an improved packet switching apparatus with multi-channel and multi-cast switching functions and a packet switching system using the same which are capable of using an ATM (Asynchronous Transfer Mode) which is a fixed length switching apparatus as a key element for a B-ISDN, providing a multi-channel switch structure having a physical and logical relationship between input/output ports, whereby it is possible to enhance a cell processing capacity of a switch.

2. Description of the Conventional Art

The key technique for a building-up of the B-ISDN is an ATM design which performs a transmission and exchange of a fixed length packet unit. In particular, the switching system which becomes a key element in designing a network apparatus must be made based on an ATM switching method. So far, many studies have been conducted concerning the ATM switch structure for the above-described purposes. As a result such intensive studies, a part of the technique is actually used in the industry.

The speed of a link which is used based on the building-up of the B-ISDN is variable. In particular, a high speed link is a consideration in the industry. As the basic speed of the initial stage of the B-ISDN, there are an STM (Synchronous Transfer Mode) –1 class 155 Mbps and an STM–4 class 622 Mbps. Recently, at the advent of high speed optical transport systems, bit rates of 2.5 Gbps, 10 Gbps, and even 100 Gbps are possible. For the reasons of the high speed and economic service network, in a DAVIC (Digital Audio and Video International Council), the ATM system requires a slower speed link as 25 Mbps and 51 Mbps. Therefore, the ATM switching system requires a switching method which is capable of effectively using various channel speed.

However, most conventional switching methods are used as a single channel switching method which has one-to-one concept in an input/output port of a switch network. Hence, the single channel switching method means that the output port physically and logically one link. Therefore, a bandwidth allocation and a routing path determination in a switch network are independently performed with respect to each port. Therefore, to support a virtual connection of nXV bps in a switching network with basic port speed of V bps, it is necessary to employ a complex multiplexing/demultiplexing scheme. Such a scheme, which enforces cells from a single virtual connection to traverse over the same physical input/output port, is essential in order not to separate cells from the virtual connection. For the above-described reasons, the construction of the system is complex, and the system is costly for the implementation thereof.

Differently from the above-described single channel switching method, the multi-channel switching method is configured in a multiple-to-multiple input/output port method. In addition, a plurality of input/output links is configured as one group, so that it is possible to logically perform a switching service as one port.

An arrived cell may exit from any output port belonging to a single logical group in the switch, and this improves a chance of exiting from the switch in a given time slot, based on a well known queueing discipline called the economies of scale. In addition, since it is possible to share the maximum total band width of multiple links of one logical port, it is possible to effectively use an effective bandwidth. In addition, the burst characteristic of an ATM traffic is adapted, for thus improving a cell loss characteristic.

Therefore, it is possible to concurrently use input/output links which need different speeds by using one switch network. At this time, since a time division multiplexor/demultiplexor having a simple function is used, the construction of the system is simple, and the cost of the system is low.

For the above-described necessities, a switching method which provided a few multi-channel switching functions are disclosed. However, there is a problem in providing the multi-channel switching, so that a cell sequence integrity method which is an important operational characteristic is not clear, for thus degrading the efficiency of the system.

In the switching system, integrating the sequence of the cells inputted is one of the important characteristics. Hence, if the sequence of the cells is not integrated in the switch network, a complex function is additionally necessary for the integrity of the cell sequence. In addition, in the end point of the service, a function for controlling the sequence of the cells is additionally necessary.

In particular, in the multi-channel switching method, the above-described function is more important. Namely, the sequence of the cells inputted through one input link and the input sequence of the cells of one virtual connection which cells are distributed to a plurality of input links must be maintained when outputting the same through the grouped links consisting of a plurality of output links.

However, in the conventional multi-channel switching method, the above-described sequences of the cells are not provided to the switch network, and the sequence information is added to a payload of the cell, and then is transferred to the end point of the service, for thus adjusting the sequence of the cells by using a buffer mechanism at the stage of the service end point.

Therefore, both end points of the service must have a specific protocol for the cell sequence integrity, and the identification of the protocol must be maintained. In addition, since the sequence information is added to the payload of the cell, the transmission efficiency of the cell is degraded.

The multicasting feature requires certain cells to be copied inside the switch. This cell copying function is traditionally done by a separate copy network, which along with the routing network, forms the overall space division switch. Namely, the cells of a desired number of ports is copied, and the paths are provided with respect the copied cells through the routing network.

For the above-described operations, the cells are copied to a plurality of output ports by using the information reacted to the amount of the copies, and the routing network must assign the path in accordance with the output port information, to which the cells with respect to each cell which is distributed to multiple ports must finally outputted. Here, the problems are that two networks of the copy network and the routing network are needed for the multicasting service, and it is difficult, if not impossible, to avoid the placement of a large size look up table between routing and copy networks.

Namely, in the copy network, the cell copy is performed by only a numerical information. When the copied cells are outputted to the output port of the copy network, a fixed output port is not assigned with respect to the cell of one virtual connection. Namely, the copied cells are outputted to a temporary port at every cell time.

Therefore, it is necessary to configure the table for determining that a corresponding cell is outputted which output port of the routing network by using an inherent information contained in the cell outputted, such as a connection number which is assigned to one value of the system, namely, a connection identification number, etc. Namely, since it is impossible to detect the copied cell is outputted to which output port of the copy network, the routing table must be configured in each output port of the copy network, and the identical routing path information must be duplicatingly provided in each table.

With the above-described operation and configuration, the entire switching system is complex. In particular, if there are many virtual paths for supporting by the input link, the capacity of the table must be large. As the speed of the system input/output link is made high, since the number of virtual connections for supporting is exponentially increased, the system is costly, and there is a problem in implementing a high speed table access.

The capacity extension of the switch network is conventionally obtained by extending a unit switch of a proper capacity to a multi-stage interconnection network. As the type of the multi-stage interconnection network, there are Banyan network, Clos network, etc. However, such the multi-stage interconnection network uses switch units based on a single channel switching paradigm. Thus, even if there are multiple physical links connecting two switch units in two successive stages, all cells belonging to the same virtual connection must utilize a single link out of these multiple links over the entire duration of connection.

When the virtual connection is being established in a switch, one specific link must be selected for each inter-stage connection. This implies that all links in the inter-stage connection must be checked individually for their available capacity. In this case, if there is not enough available capacity in any of the links checked, the connection cannot be established even if there is sufficient capacity available scattered over multiple links.

SUMMARY OF THE INVENTION

Accordingly, it is an object of the present invention to provide an improved packet switching apparatus with multi-channel and multi-cast switching functions and a packet switching system using the same which overcome the aforementioned problems encountered in the conventional art.

It is another object of the present invention to provide an improved packet switching apparatus with multi-channel and multi-cast switching functions and a packet switching system using the same which are capable of effectively using an input/output link in excess of a basic speed V of a switch by providing a multiple-to-multiple function in a relationship between an input/output port of a switch, namely, a multi-channel function (a super-rate switching function), and using a link having different speed by one switch network by dynamically configuring the number of a group unit available link of a link (a multi-rate switching function), for thus improving a service available capacity of a switching apparatus.

It is another object of the present invention to provide an improved packet switching apparatus with multi-channel and multi-cast switching functions and a packet switching system using the same which are capable of reducing the kinds of networks which are needed for configuring the switching apparatus by concurrently processing a cell copy function and a routing function in one network for providing a multi-casting function, and which eliminates the need for large size look tables between the copy network and the routing network along with complex control schemes in maintaining information in the tables.

It is another object of the present invention to provide an improved packet switching apparatus with multi-channel and multi-cast switching functions and a packet switching system using the same which significantly reduces the cell loss by efficiently concentrating and recirculating the cells that are not able to exit through the output due to contention.

It is another object of the present invention to provide an improved packet switching apparatus with multi-channel and multi-cast switching functions and a packet switching system using the same which are capable of providing a multi-channel switching function and maintaining the time sequence among the cells, whether they enter into the switch from the same physical link or from multiple links forming a single group, throughout the entire switching process.

It is another object of the present invention to provide an improved packet switching apparatus with multi-channel and multi-cast switching functions and a packet switching system using the same which are capable of simplifying a path assigning operation through a bandwidth searching in a switching apparatus by providing a multi-channel switch for a unit switch in a multiple network structure which is mainly used for extending the capacity of a switching apparatus by using the unit switch as a basic switch, and which maximizes the cell processing capability of the switch by considering multiple links as a single combined resource.

It is another object of the present invention to provide an improved packet switching apparatus with multi-channel and multi-cast switching functions and a packet switching system using the same which results in a crossbar structure consisting of simple 2×2 switch elements organized in rows and columns for the routing network and concentration network, thereby increasing the efficiency in the VLSI wiring area.

To achieve the above objects, there is provided an improved packet switching apparatus with multi-channel and multi-cast switching functions and a packet switching system using the same which include an output group address generator for providing an address information of an output port grouped, a routing unit for receiving cells which are recirculated through a recirculation path and newly inputted cells, assigning output links to these cells with preference given to the recirculated cells when an output port-dependent address inputted from the output group address generator and a destination address set in a routing tag of a cell inputted by the port are identical, and outputting the cells which was not assigned of the output link through a plurality of bypass links, a recirculation path setting unit for selecting a cell as many as the number of circulation paths among cells outputted from the routing unit through the plurality of the bypass links and for outputting the cells through the recirculation link, and a synchronization unit for receiving a cell which is recirculated from the recirculation path setting unit through the recirculation link, time-synchronizing the cells recirculated and the cells which are newly inputted into the routing unit, and outputting the recirculated cells to the routing unit.

To achieve the above objects, there is provided an improved packet switching system which includes an output group address generator for providing an address information of an output port grouped, a routing unit for receiving cells which are recirculated and inputted through a recirculation path and newly inputted cells, assigning an output link to each of these cells when the output port address of the output link from the output group address generator matches the destination address in the routing tag of the cell, with preference given to the recirculated cells, and outputting the cells, which were not assigned of the output link, through a plurality of bypass links, a recirculation path setting unit for selecting the cells as many as the number of recirculation paths among the cells inputted from the routing unit through the bypass links and for outputting the cells through the recirculation link, and a synchronizing unit for receiving a recirculated cell from the recirculation path setting unit through the recirculation link, synchronizing the recirculated cells and the cells which are newly inputted into the routing unit, and outputting the recirculated cells to the routing unit, for thus performing a switching function with respect to the input/output link wherein the input/output speed exceeds a predetermined speed, wherein the packet switching system includes a maximum processing speed of each input port including a switch network having a predetermined speed, a plurality of input ports having a predetermined speed and a maximum output speed include one output port having a predetermined speed exceeding the speed, a time division multiplexor for providing an even service time with respect to each input is connected to a plurality of output ports of the switch network, one input port having a predetermined speed exceeding the speed and a maximum output speed include a plurality of output ports having a predetermines speed, and a time division demultiplexor having an even characteristic of a service time with respect to each output port is connected to a plurality of input ports of the switch network.

To achieve the above objects, there is provided an improved packet switching system which includes an output group address generator for providing an address information of an output port grouped, a routing unit for receiving cells which are recirculated and inputted through a recirculation path and newly inputted cells, assigning an output link to each of these cells when the output port address of the output link from the output group address generator matches the destination address in the routing tag of the cell, with preference given to the recirculated cells, and outputting the cells, which were not assigned of the output link, through a plurality of bypass links, a recirculation path setting unit for selecting the cells as many as the number of recirculation paths among the cells inputted from the routing unit through the bypass links and for outputting the cells through the recirculation link, and a synchronizing unit for receiving a recirculated cell from the recirculation path setting unit through the recirculation link, synchronizing the recirculated cells and the cells which are newly inputted into the routing unit, and outputting the recirculated cells to the routing unit, wherein the packet switching system includes a switch network for performing a unit switching function, a multi-stage connection networks using a plurality of switch networks, a plurality of connection links between unit switches of one group, and a logic group for assigning an identical address with respect to a plurality of output links of the unit switch of a front point, for thus forming one logic group, wherein a plurality of input cells outputted from the unit switch through one input link are outputted to one of output links at every cell transmission time and then are inputted into the unit switch of an end point.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
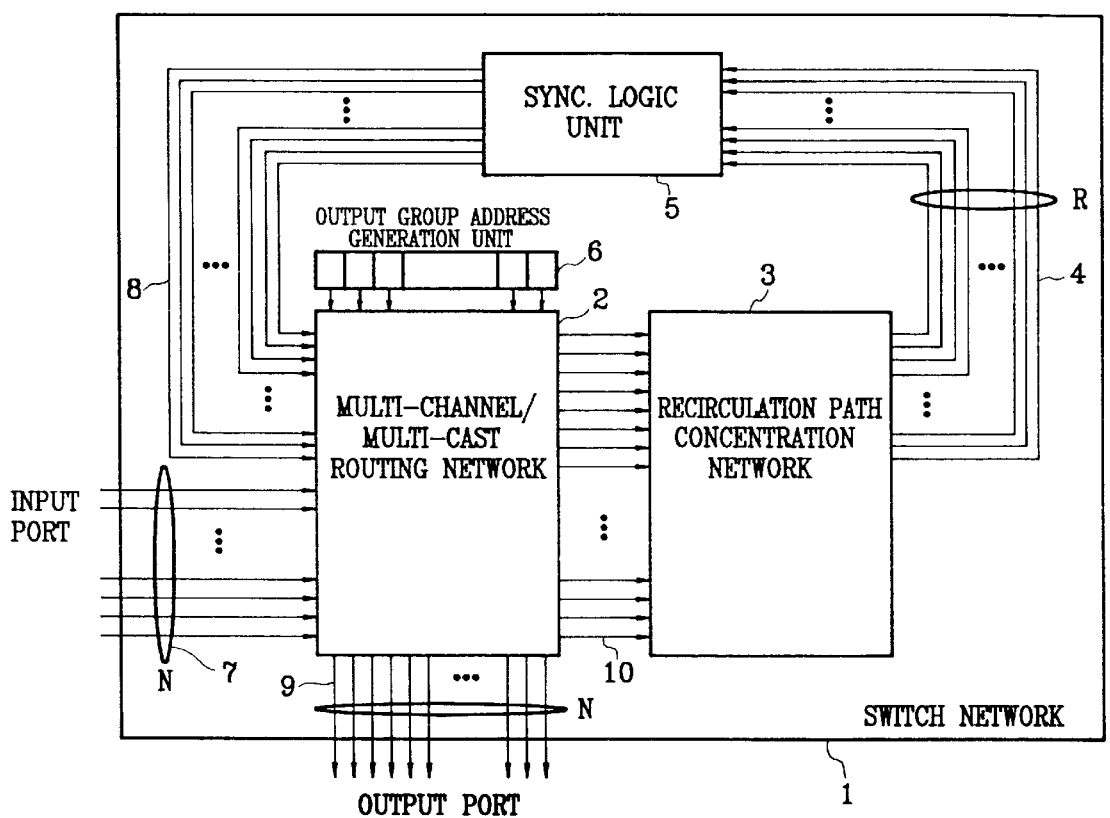
FIG. 1 is a block diagram illustrating a multi-channel/multi-cast switching apparatus according to the present invention.

FIG. 1 is a block diagram illustrating a multi-channel/multi-cast switching apparatus according to the present invention.

As shown therein, the multi-channel/multi-cast switching apparatus according to the present invention, which apparatus is basically directed to concurrently providing a multi-channel and multi-cast function and achieving a better operational performance, includes an MMRN (Multi-channel/Multi-cast Routing Network) 2 for providing a multi-channel switching and multi-cast switching function, an RPCN (Recirculation Path Concentration Network) 3 for providing a function of selecting as many of cells as the number of recirculation paths among those lost the output contention, a recirculation output link 4 for recirculating the cells selected through the RPCN 3 to an input of the routing network, a synchronous logic unit 5 for providing a time-dependent synchronization between a cell which recirculates through the recirculation output link and the cells newly inputted into the routing network, and an OGAB (Output Group Address Broadcastor) 6 for providing an address information of a grouped output port.

The operation of the multi-channel/multi-cast switching apparatus according to the present invention will now be explained with reference to the accompanying drawings.

First, the OGAB 6 inputs an output port grouping address information from a system controller during a system initialization or a service time into the multi-channel/multi-cast routing network 2. The address information inputted is used for a comparison of a destination address of an input cell for determining a routing path of a destination output port of the cells inputted from the multi-channel/multi-cast routing network 2.

The cells inputted through the input link 7 and the recirculation input link 8 are assigned of a path to an output port through an output link 9 or a path to the circulation path concentration network 3 through a bypass link 10 through a comparison process between a corresponding destination address and an output port grouping address from an output group address generator 6 in the multi-channel/multi-cast routing network 2.

The cells which were assigned of the path to the output port are directly outputted through the output link, and the cells which were assigned of the path to the bypass link 10 are outputted into the recirculation path concentration network 3, and then an R-number of cells which is the link number limited by the recirculation path concentration network 3 is selected, and is inputted into the synchronous logic unit 5 through the recirculation output link, and the synchronous logic unit 5 provided a function for adjusting a time difference so that the cells inputted through the recirculation output link are synchronized with the cells inputted through the input link 7.

The recirculation cells the time difference of which is adjusted and the cells inputted into the switching apparatus through the recirculation input link 8 are inputted into the multi-channel/multi-cast routing network 2, respectively. The above-described routines are repeatedly performed for a predetermined number.

Namely, the present invention is directed to externally providing a switch having an N-number of input ports. However, the packet switching apparatus according to the present invention internally includes a switch having a characteristic of a shared memory corresponding to an R-number of cells, so that the total input of the multi-channel/multi-cast routing network 2 is "N+R=M".

The maximum N-number of cells among the M-number of cells is assigned of a switching path of the output port, and the cells which was not assigned of any path are inputted into the recirculation path concentration network 3 through the bypass link, and then only R-number of cells is selected, and is inputted into the multi-channel/multi-cast routing network 2 through the synchronization process, and then is given a new competition for a path assigning to the output port together with the cells which are newly inputted.

Figure 2:
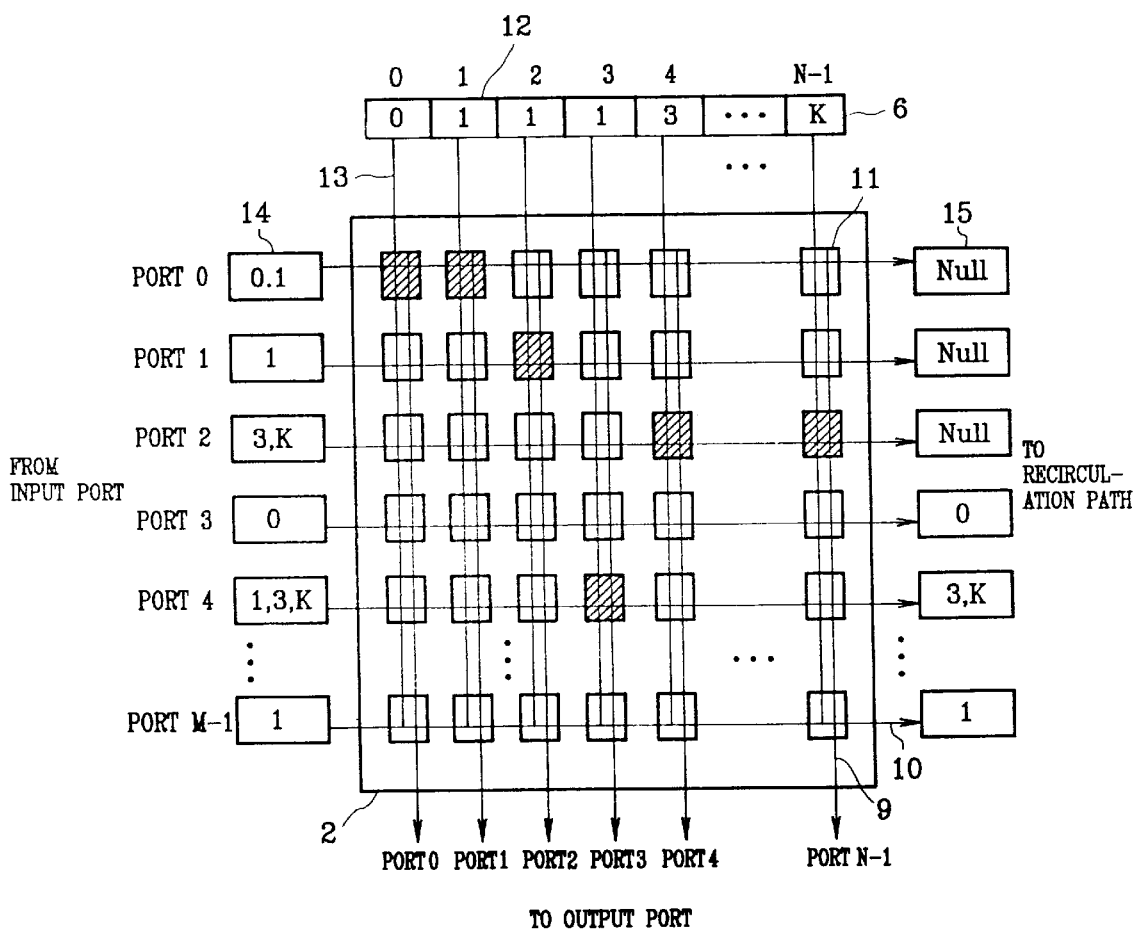
FIG. 2 is a diagram to explain an operation of a routing network according to the present invention.

FIG. 2 is a diagram to explain an operation of a routing network according to the present invention.

As shown therein, the multi-channel/multi-cast routing network 2 consists of M input links, N output links, and M bypass links.

The multi-channel/multi-cast routing network 2 is formed in a crossbar network type which consists of a switch device 11 having a 2×2 operational characteristic. Namely, the multi-channel/multi-cast routing network 2 consists of an M×N number of switch devices.

The operation of the multi-channel/multi-cast switching operation in the multi-channel/multi-cast routing network will now be explained with reference to the accompanying drawings.

First, the output group address generator 6 which provides an output port address information includes a total N-number of grouping address information 12, for thus providing a channel grouping information set in accordance with a system requirement.

As shown in FIG. 2, there is an output port "1" which consist of three physical links. Namely, among the input cells, the cells having an output address "1" means that it is possible to provide maximum three paths at the same time. Here, the condition of the number "G" of the grouping link with respect to the output address is $1 \leq Gi \leq N$, and the sum of Gi can not exceed N, provided that $1 \leq i \leq N$. Namely, one logic output link consists of an N-number of physical links from "1".

The above-described output port channel grouping address information is provided to all switch devices of a column through the address transfer path 13 consisting of columns.

As shown in FIG. 2, the first column of the multi-channel/multi-cast routing network 2 receives an information with respect to the output port address "0", and the columns from the second column to the fourth columns receive an information with respect to the output port address "1", and the fifth column receives an information with respect to the output port address "3".

The input cell 14 inputted through an M-number of input links is inputted in a form that the routing tag region is added to the front end of the ATM cell of 53 bytes, and this routing tag includes a plurality of output port address information for the multi-casting operation. In order to express a plurality of output ports within the routing tag having a limited number of bits, a bit addressing method of assigning the bit one by one by the output unit is used.

For example, if the switch size is 8×8, the routing tag of the cell which needs output ports 0, 1, and 4 can be expressed as "00010011". Here, the leftwardmost bits are the bits related to the port 7, and the bits from the leftwardmost are the bits related to port 0.

The information of this routing tag is compared with the output port grouping address information from the output group address generator 6 in each switch device. As a result of the comparison, if the information is identical therewith, and the switch device arranged in the upper portion of the identical column is not connected with the output port, the input cell is connected with the output port. Namely, only one switch device in the identical column is connected with the output port. In addition, the cell which made the connection eliminates the address information from the routing tag, so that the routing is not duplicatingly performed to another output port grouped to on group in the identical row.

Figure 3:
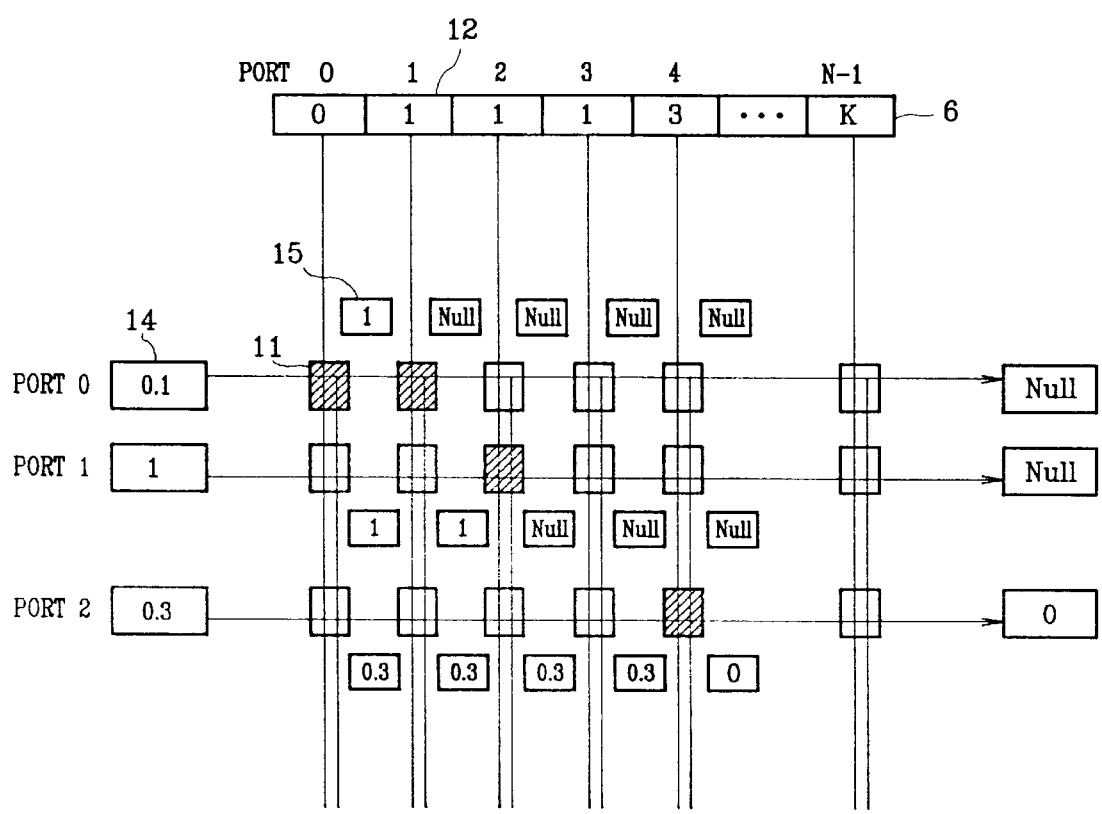
FIG. 3 is a diagram to explain a routing tag conversion according to the present invention.

The cell 15 which is outputted through the routing tag conversion process in the identical row and then is finally outputted is converted into the routing tag having only a destination address information which must be outputted at the next cell transmission time. The information conversion process of the routing tag will now be explained with reference to FIG. 3.

As shown therein, the cells inputted through the input port "0" includes a destination output port address of "0" and "1" and request a multi-casting, and the cell of the input port "1" requests a routing to only the output port "1", and the cell from the input port "2" includes output port addresses of "0" and "3".

The switch device of the first row and the first column is provided with a path to the output port "0" with respect to the cell from the input port "0" through the address comparison process, and the information with respect to the output "0" is eliminated from the routing tag, and the only the information with respect to the output port "1" is transferred to the next switch device in the identical row.

In addition, the switch device of the first row and the second column is provided with a path to the output port "1", and the information with respect to the output port "1" is eliminated from the routing tag and is converted into an unassigned cell having a null routing tag information, namely, in a state that there is not a desired output port.

The switch device of the second row and the first column is not provided with any path since the grouping address information 12 from the output group address generator 6 and the address of the routing tag are not identical, so that the routing tag information is provided to the second switch device of the identical row in a state that there is not a conversion of the routing tag.

The switch device of the second row and the second column may be provided with a path since the address information is identical, but since the switch device of the upper portion of the identical column is previously provided with a path, the path setting is not performed, and then the conversion of the routing tag is also not performed.

The switch device of the second row and the third column does have a switch device above it whose address information is identical. The above switch device therefore does not make any connection. This along with the identical address information at the switch device of the second row and the third column allows this switch device to make the connection and to modify the routing tag of the arrived cell to null status before passing to the next switch device in the same row. Based on this action, all the remaining switch device in the same row would not take any action of making the connection.

Since the cell from the input port 2 is only assigned of a path to the output port 3 since the path with respect to the output 0 is not set in the upper portion of the first column, since there is no more output left in output group 0, the routing tag is outputted to the end point of the remaining row in a state that there exists only the information with respect to the output port 0.

Figure 4:
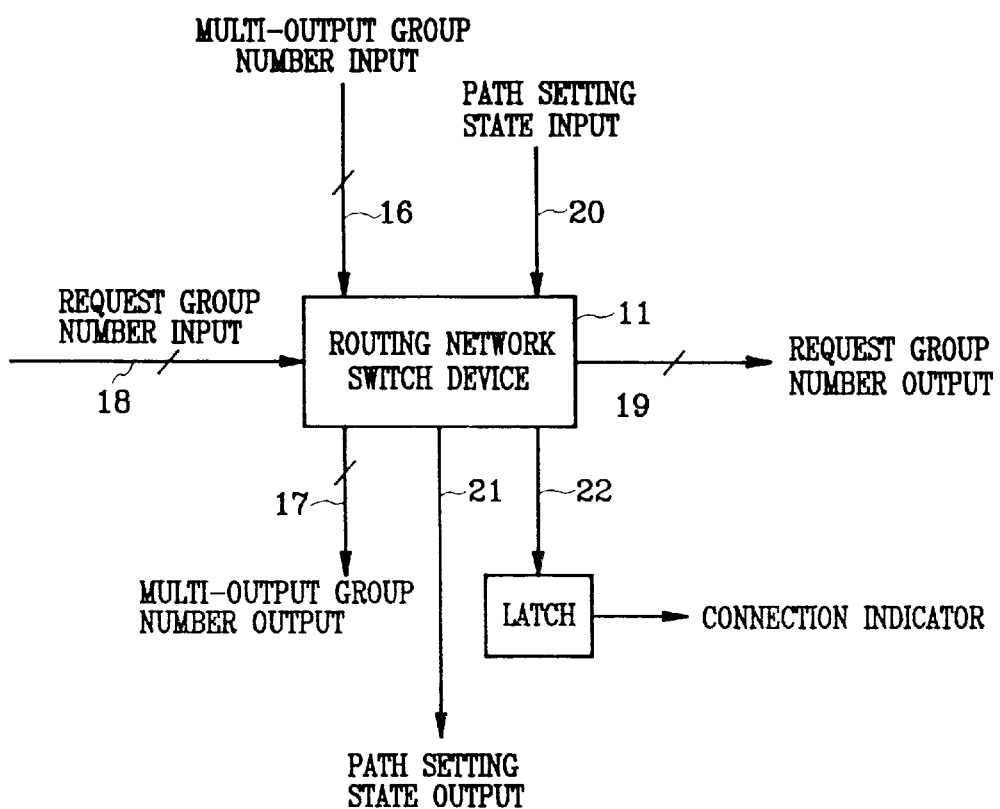
FIG. 4 is a diagram illustrating a signal configuration of a routing network switch device according to the present invention.
Figure 5:
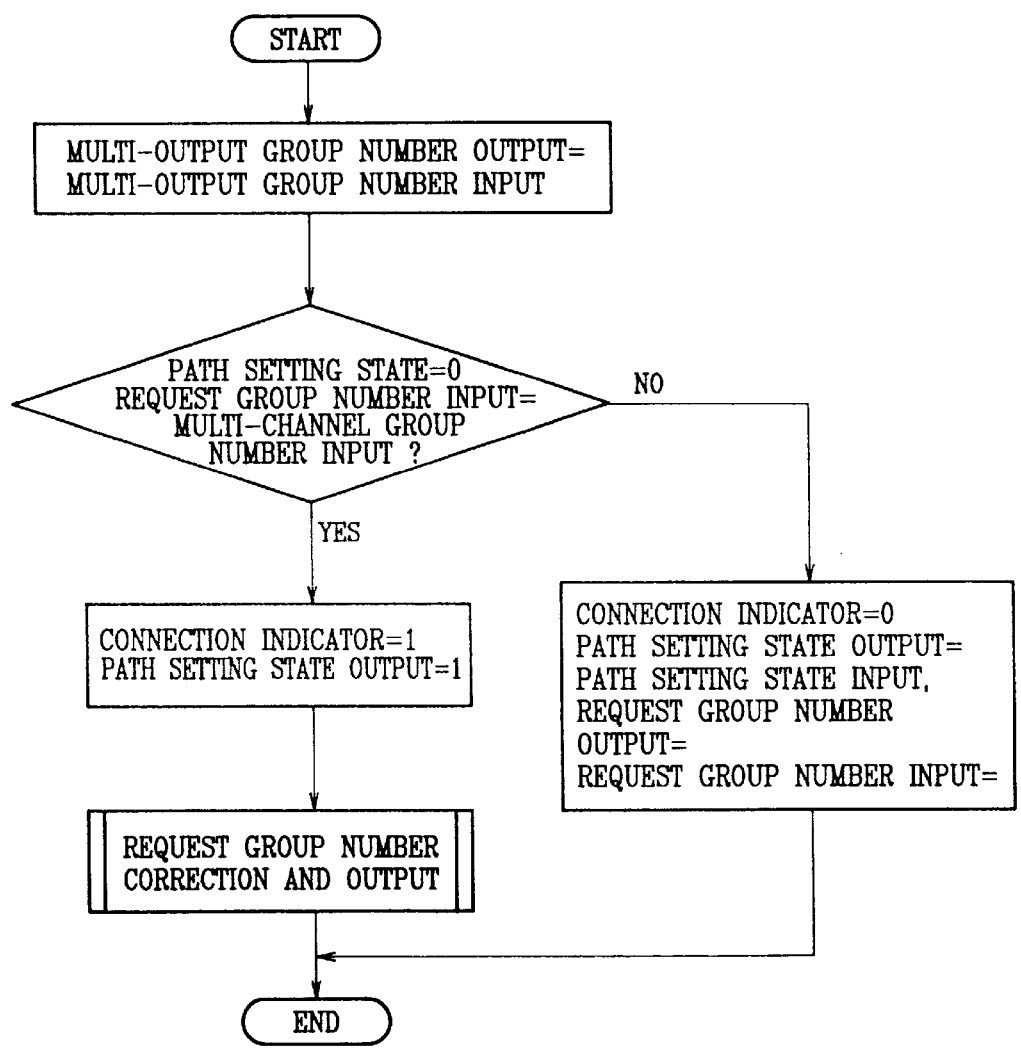
FIG. 5 is a flow chart illustrating an operation of a routing network switch device according to the present invention.

FIG. 4 is a diagram illustrating a signal configuration of a routing network switch device according to the present invention, and FIG. 5 is a flow chart illustrating an operation of a routing network switch device according to the present invention.

The input 16 of the multi-channel output group number is an output port grouping address information from the output group address generator 6 and consists of a plurality of bit groups in accordance with an operational speed which is needed for the switching system for a parallel processing.

The output 17 of the multi-channel output group number is an information that the input 16 of the multi-channel output group number is transferred to the next switch device through the switch device. The contents thereof is identical to the input 16 of the multi-channel output group number.

The input 18 of the request group number is a routing tag information inputted to the switch device and consists of a plurality of bit groups in accordance with an operational speed which is needed for the switching system for a parallel processing.

The output 19 of the request group number is an information that the number of request groups is converted in accordance with a path assigning by the switch device.

A path setting state input 20 is a path setting state information of the upper portion switch device of the identical column.

A path setting state output 21 is a path setting state information of a corresponding switch device and is provided to a switch device of a lower portion as a path setting state input.

A connection indicator 22 is a signal indicating a path setting state of a position device after the comparison process for a path setting is completed and is used as an enable signal for providing a data path of the input cell.

FIG. 5 is a flow chart illustrating an operation of a routing network switch device according to the present invention.

As shown therein, the comparison operation of each switch device for setting a path is repeatedly performed until all switch devices in the multi-channel/multi-cast routing network are completed, and consists of a simple gate logic circuit without a synchronous circuit such as a flip-flop circuit.

Namely, the path setting state input 20 and the output signal 21 can be repeatedly converted until the path setting of all the switch device of the multi-channel/multi-cast routing network are completed, and there is not state conversion after all comparison operations are completed. This time is called a path setting time.

The connection indicator 22 operates a circuit with respect to the data transfer path of the input cell using this signal in a state that the final switch device is set after a path setting time t.

In accordance with the above-described operational characteristic, the priority is in competition with respect to the output port. The cell inputted into the input port 0 has the priority in the input sequence of the network, and then the priority sequence is decreased in accordance with the port sequence number, so that the cell inputted into an (M−1)th port has the low priority.

This sequence may be recognized as there is a problem in a proper competition between ports; however, it is an important functional element in maintaining a sequence of the cells in the identical links and between cells distributed to a few input links. The operation for maintaining the sequence of cells in the entire switching apparatus will now be explained with reference to FIG. 9.

When the above-described path setting process is completed, the number of switch devices in the row connected to the output port is maximum one. In addition, the cell is transferred to the destination output port through the path established in such a manner, namely, the output link 9 as shown in FIG. 2.

As described above, the multi-channel/multi-cast routing network internally has a non-blocking characteristic. In addition, the multi-channel/multi-casting function is provided in one network, so that it is possible to maximize the cell processing ratio of the switch. Since the multi-casting is concurrently provided, differently from the conventional switching apparatus, a complex connection path management table is not necessary between the copy network and the routing network. In addition, since the cross-bar network is used as a basic type, when integrating the functions of the system, it is possible to fabricate a compact size system. Since the layout is made easier, it is possible to fabricate the system as low price.

Figure 6:
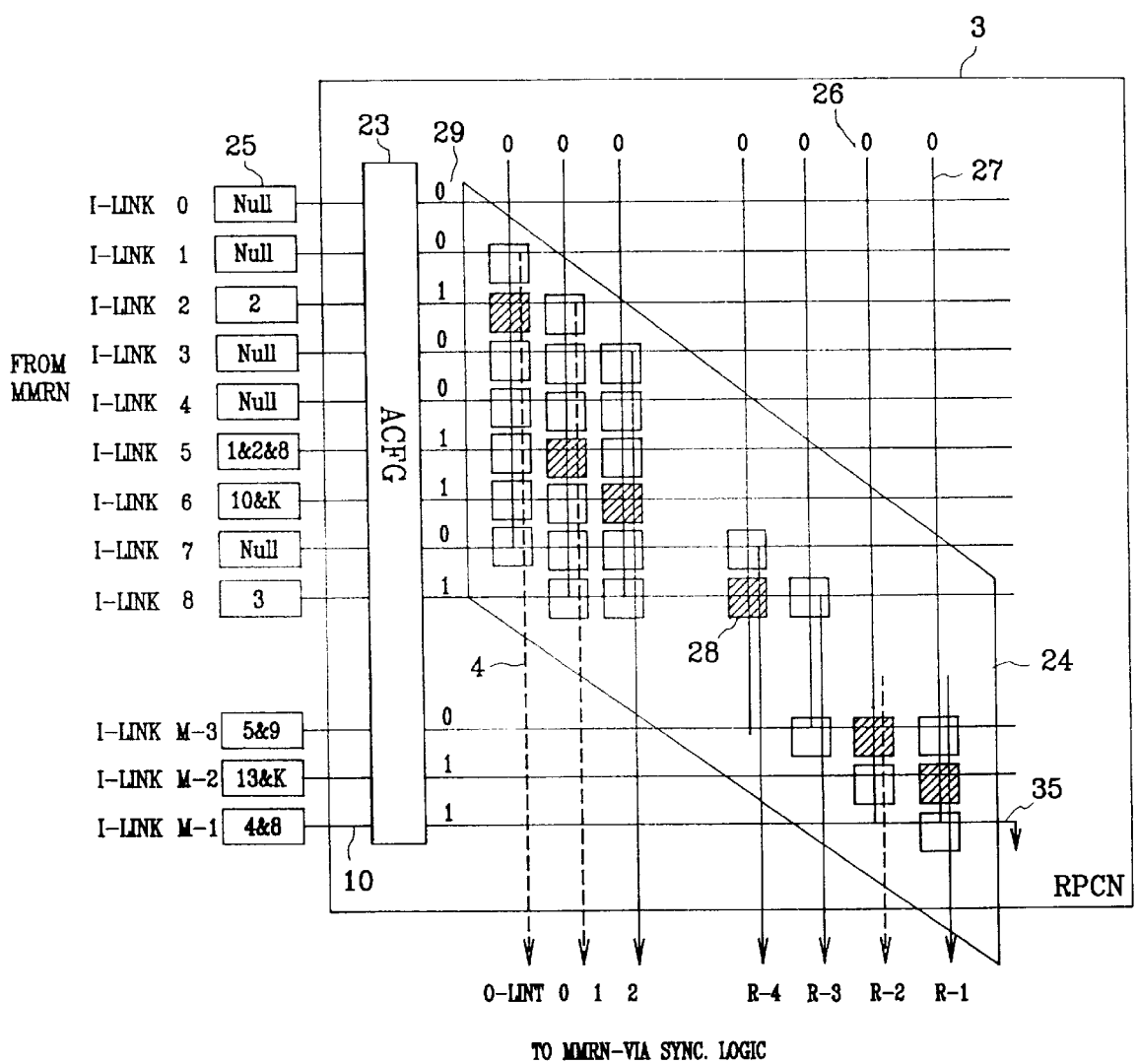
FIG. 6 is a diagram illustrating the construction of a recirculation path concentration network according to the present invention.

FIG. 6 is a diagram illustrating the construction of a recirculation path concentration network according to the present invention.

As shown therein, the recirculation path concentration network selects cells as much as an R-number of recirculation paths among the cells transferred to the bypass link 10 which was not provided with any path during the multi-channel/multi-cast routing network and performs a function of transferring the cells to the multi-channel/multi-cast routing network as an input through the recirculation link.

The recirculation path concentration network consists of an M-number of inputs and an R-number of recirculation output links 4. As a function block, it consists of an ACFG (Assigned Cell Flag Generator) 23 and an RPC (Recirculation Path Comparator) 24.

The assigned cell flag generator 23 checks the routing tag from the bypass link 10 through the routing tag conversion process by the multi-channel/multi-cast routing network on whether there is a destination output port address in the routing tag.

As a result of the checks, if a path to the output port is assigned in the multi-channel/multi-cast routing network, the routing tag has a null address information, otherwise since the destination address to be outputted at the next cell transmission time exists in the tag, the assigned cell flag generator 23 checks that the information in the tag is in a state of null. As a result of the checks, if the information is a null state, the flag 29 is made to 0, and if there is a destination address, the flag is made to 1.

The recirculation path comparator 24 selects an R-number of cells the flag 29 of which is 1 by using the flag 29 from the assigned cell flag generator 23, performs a function of assigning a path to the recirculation output link 4, and consists of a 2×2 switch device as many as R×N.

The recirculation path assigning process by the recirculation path comparator will now be explained with reference to FIG. 6.

The information type of the routing tag inputted into the assigned cell flag generator 23 through the bypass link 10 are the same as the routing tag 25. The assigned cell flag generator 23 makes the flag as "0" if the routing tag is null, and makes the flag as "1" if the routing tag is not null in accordance with the state of the bypassed routing tag 25.

Each column of the recirculation path comparator 24 receives a comparison initial value 26 of "0" through the state link 27. Each switch device of the recirculation path comparator 24 determines a path assigning to the recirculation link of a corresponding link by using the information of the flag 29 from the assigned cell flag generator 23 and the path setting state information from the switch device positioned just above the identical column.

For example, since the flag 29 from the bypass link "1" is "0", and the path to the output port which is needed for the multi-channel/multi-cast routing network is all assigned, the recirculation path comparator 24 is not assigned of the recirculation path.

Since the flag 29 from the bypass link "2" is "1", the path to the recirculation link "0", is set, and the state of the flag 29 is converted to "0", for thus preventing a duplicating recirculation path setting in the identical row.

Since the cell from the bypass link "5" is assigned of the recirculation path in the first column, the bypass path is assigned in the second column. In this manner, it is possible to assign the recirculation path of the cells from the first volume to an R-th column. If the number of the cells which have the flag of "1" exceeds R-number, only the R-number of cells is recirculated, and the remaining cells is processed as drop by the recirculation path comparator 24.

For example, the cells inputted through the (M−1)th by pass link as shown in FIG. 6 is processed as drop by the recirculation path comparator 24. Namely, there occurs a cell drop. If the system required cell drop ratio is high, the value "R" is reduced, and then the multi-channel/multi-cast routing network and the hardware of the recirculation path concentration network are reduced. On the contrary, if the system required cell drop ratio is low, the structure is configured, which is capable of increasing the value "R". Namely, since the value "R" is considered to perform a function of the sharing memory, the cell drop ratio is determined based on the value "R". As another important characteristic, the input cells through the first row of the multi-channel/multi-cast routing network has the top priority compared to the other cells, the input cells through the first row are assigned of all the path by the multi-channel/multi-cast routing network.

Therefore, in the recirculation path concentration network, the construction of the switch device with respect to the first row is not needed.

The 2×2 switch device 28 consisting of the recirculation path concentration network as shown in FIG. 6 has a function which is very similar to the function of the multi-channel/multi-cast routing network. However, it has a more simplified construction and function. The construction and the operational characteristic of the input/output signal from the recirculation path concentration network will now be explained with reference to FIGS. 7 and 8.

Figure 7:
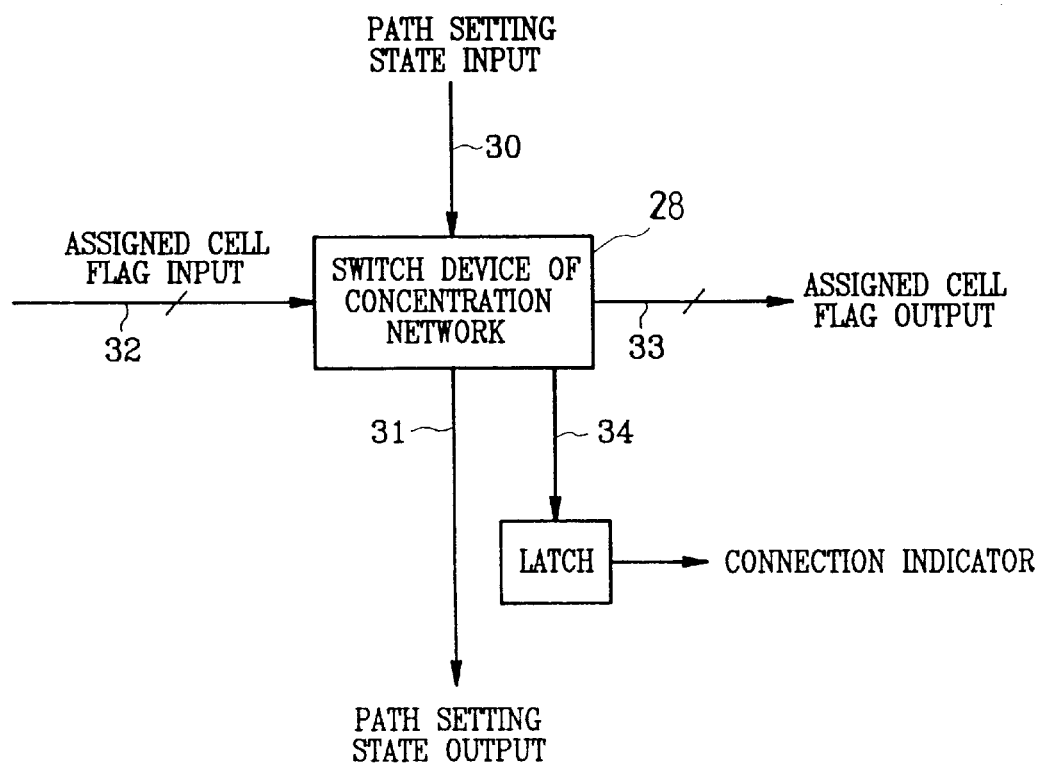
FIG. 7 is a diagram illustrating a signal configuration of a switch device of a recirculation path concentration network according to the present invention.

The construction of the signal as shown in FIG. 7 is as follows.

The path setting state input 30 indicates a path setting state of a switch device just above the device in the identical column. If the value is 1, it denotes a path set.

The path setting state output 31 indicates a path setting state, which output is outputted to the switch device of the identical column based on its path set state, and if the value is "0", it indicates that there is not a path set in the switch device of the upper portion.

The assigned cell flag input 32 denotes a flag 29 which indicates the routing tag state of the cell. The switch device of the first column receives an input from the assigned cell flag generator, and the next switch devices receives an input from the leftward switch device. Each switch device checks the flag. If the value is 1, the path setting is performed, and if the value is 0, no operation is performed, and the value is transferred to its rightward switch device. If the path setting is performed, the flag is converted to 0, and there does not occur a path setting operation in the switch device in the identical row.

The assigned cell flag output 33 is a signal of the path setting state of the switch device, which signal is transferred to the rightward switch device. If the inputted assigned cell flag is 0, the signal is transferred to the rightward switch device, and the flag is 1, the value is varied in accordance with its path setting state and then is transferred to the rightward direction.

The connection indicator 34 indicates a signal which denotes a final state after the path setting operation of all the switch device in the recirculation path concentration network like the connection indicator of the multi-channel/multi-cast routing network is completed. The transfer path setting of the cell in the recirculation path concentration network is performed by using such signal.

Figure 8:
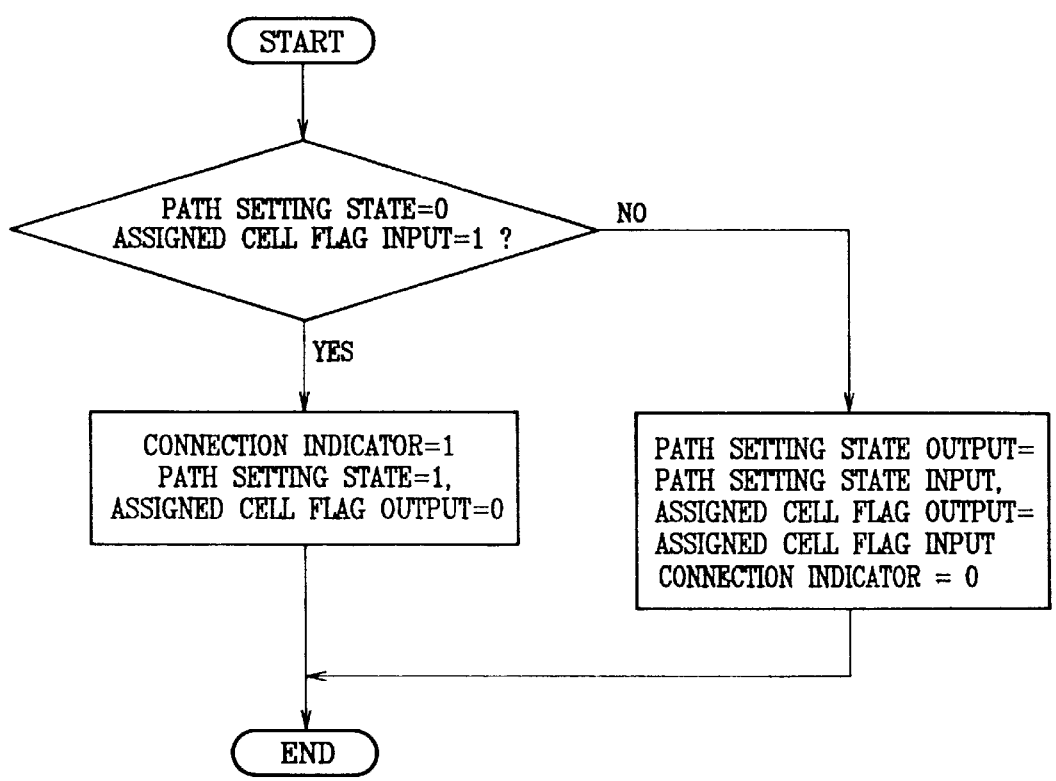
FIG. 8 is a flow chart illustrating a recirculation path concentration network switch device according to the present invention.

FIG. 8 is a flow chart illustrating an operation process of a switch device based on the state of the input signal. As shown therein, the routine is repeatedly performed until all the switch devices in the recirculation path concentration network are set. In addition, the switch device of the recirculation path concentration network consists of a simple gate logic differently from the construction of the synchronous logic (flip-flop) like the switch device of the multi-channel/multi-cast routing network. Maintaining a sequence integrity among the cells of one virtual connection distributed and inputted to a plurality of input links is very important.

In particular, if the switch structure has a recirculation path, since the cells through the recirculation path is earlier than the cells which are newly inputted through the input link, in order to maintain the cell sequence integrity, a priority must be provided for providing a path to cells through the recirculation path. The switch construction according to the present invention satisfies the conditions for all the cell sequence integrity. The operation thereof will now be explained with reference to FIG. 9.

Figure 9:
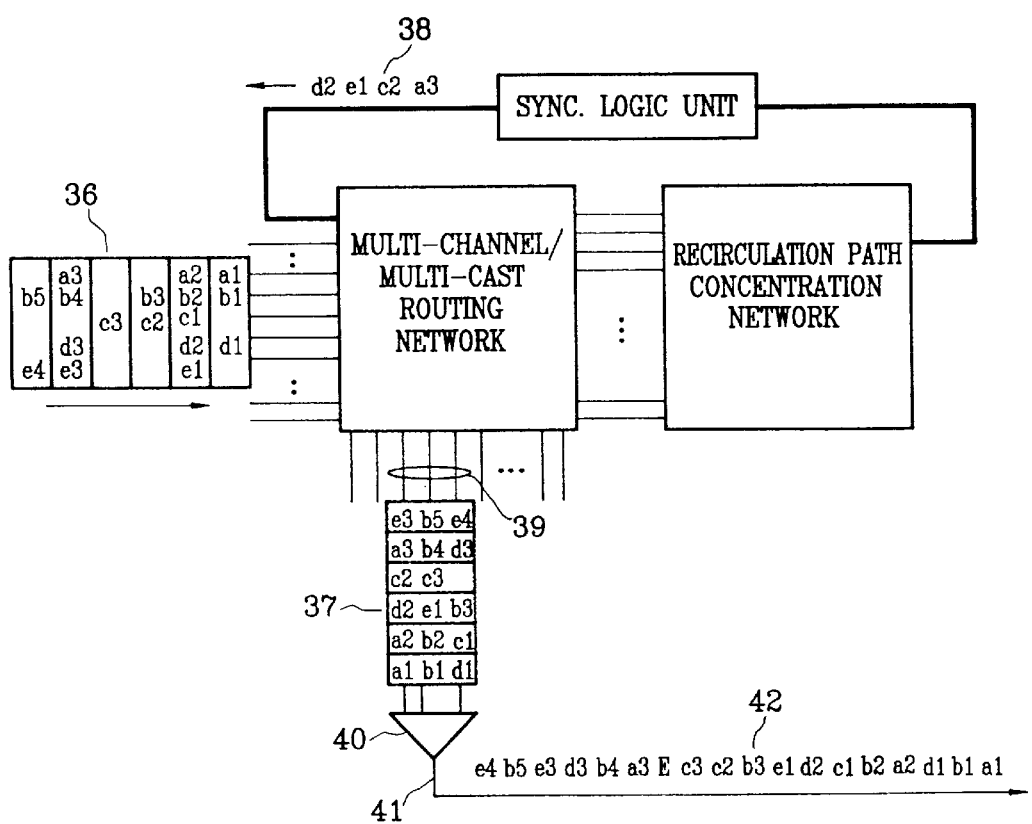
FIG. 9 is a diagram illustrating a cell sequence integrity according to the present invention.

As shown in FIG. 9, three output links of the cells inputted through five input links are grouped as one group 39 for a cell sequence integrity when routing cells between input cells.

Cells a1, b1, and d1 are inputted through each link at a first cell time, and the cells a2, b2, c1, d2, and e1 are inputted at the next cell time. There are two cases in each link. One of which is that there exists a cell at every time, and another of which is that there does not exist a cell at every time. FIG. 9 illustrates a sequence that the cells are inputted by a sixth cell time.

In the multi-channel/multi-cast routing network and the recirculation path concentration network of the switching apparatus, the cell inputted through the upper portion row with respect to the destination address or the remaining recirculation paths has the top priority during the path assigning compared to the cells inputted through the lower row.

The time-based input cell type 36 of the cells inputted is illustrated in FIG. 9. The cells a1, b1, and d1 which are inputted at the first cell time are all assigned of a path to the output port at the identical cell time and then are outputted, and in the case of the input, the output port is assigned from the leftward direction to the rightward direction in accordance with the sequence from the upper portion to the lower portion.

Since the number of the cells inputted at the second cell time is 5, and the group of the output port is 3, these cells a2, b2, and c1 from the upper portion among five input cells are assigned of a path, and the remaining two cells d2 and e1 are recirculated through the recirculation path concentration network.

The cells d2 and e1 recirculated at the third cell time and the cells b3 and c2 which are newly inputted compete with each other with respect to three output ports. Since the cells through the recirculation path has an earlier priority compared to the cells which are newly inputted, the paths to the output ports are assigned of d2, e1, and b3, and c2 is recirculated. Therefore, since there are cells c2 and c3 at the fourth cell time, two cells are all outputted.

The time sequence by the port of the cells outputted through the above-described processes is the same as the output cell type 37 as shown in FIG. 9. The time-based order of the cells through the recirculation path is shown as the element 38. In view of the sequence, the input link-dependent cell sequence, and the link-dependent cell sequence are maintained. Therefore, three output ports are multiplexed, and then a system which support a high speed output link 41 is configured, so that a time division multiplexor 40 is added, and the switch output port are multiplexed in the order from the leftwardmost port to the rightward direction one by one. The type of the cells which are finally outputted by the above-described multiplexing function are shown in 42.

The switch structure according to the present invention provides a multi-channel switching function, so that it is possible to provide super-rate and multi-rate switching functions. Namely, if the basic speed of each port of the switch network is v, it is possible to use a system input/output link which requires a speed of nxV in accordance with the number of ports of one channel group. This is called a super-rate switching function. In addition, it is possible to support the input/output links, which require different speed, such as 155 Mbps, 622 Mbps, 2.5 Gbps, etc., by using one switch network. This function is called a multi-rate switching function.

Figure 10:
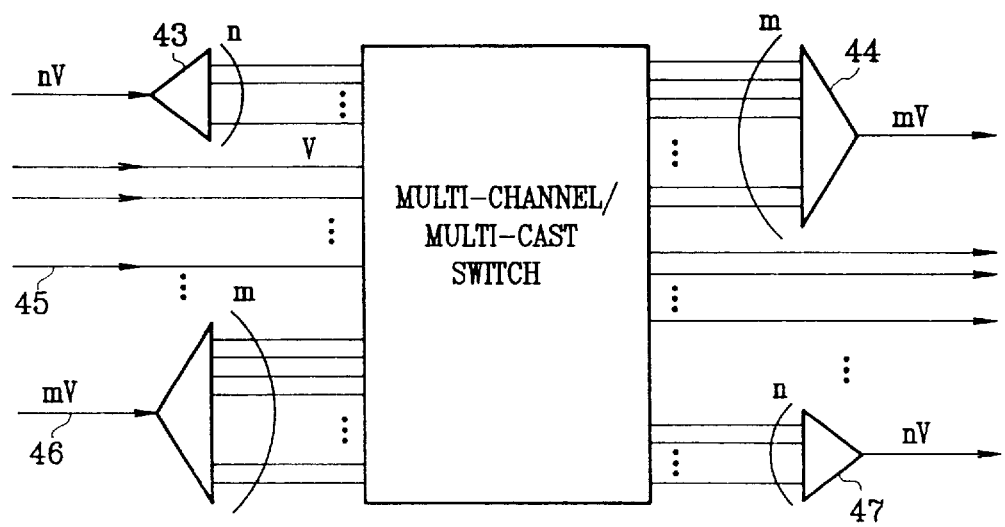
FIG. 10 is diagram illustrating a super/multi-rated switching system according to the present invention.

Therefore, as shown in FIG. 10, it is possible to provide a multi-channel switching function with which it is possible to implement an input/output of the system having different speeds and a super-rate switching function which is capable of receiving an input/output link which is a predetermined time the basic speed of the switch network.

As shown in FIG. 10, one switch network includes a multiplexor 47, a demultiplexor 43 thereof having an output speed of nxV, a multiplexor 44 having an mxV output speed and a demultiplexor 46 thereof, and an input/output link 45 having a basic speed.

The demultiplexor performs a function which is contrary to the operation of the multiplexor as shown in FIG. 9. Namely, the demultiplexor performs a function of a time division demultiplexor.

Figure 11:
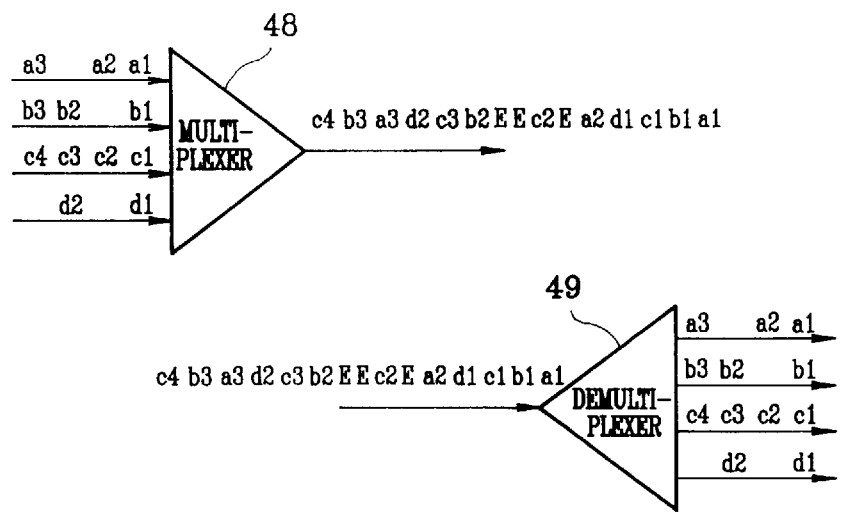
FIG. 11 is a diagram illustrating a functional construction of a multiplexor/demultiplexor according to the present invention.

FIG. 11 illustrating a multiplexing operation and demultiplexing operation based on a time division of the multiplexor 48 and the demultiplexor 49. Here, it is possible to evenly provide a function of a multiplexor and a demultiplexor with respect to each input link. If there is not a cell, it is possible to provide an assigned service time. This operational characteristic makes it possible to maintain a cell input sequence based on the time, and it is possible to maintain the sequence between cells of one virtual connection which cells are distributed to a plurality of links and inputted thereto.

The switch structure having large capacity uses a method of configuring a unit switch which has smaller input/output capacity by using multi-stage method.

There may be various multi-stage methods based on the type of multi-stage interconnection networks. For example, there are a multi-stage network of a Banyan type, a multi-stage network of a Benes type, a multi-stage network of a Clos type, etc. In addition, it is possible to configure various types of multi-stage networks by slightly varying the structure thereof in consideration with a cell drop and easiness of the implementation which are different from its type.

In addition, when configuring the multi-stage network, one unit switch and another switch of the next stage are connected to each other by a plurality of links. The basic concept of the present invention is to improve the performance of the switch by recognizing a plurality of links as one logic group, and in the present invention, the multi-channel switching function is adapted to the extension method of the switch.

Figure 12:
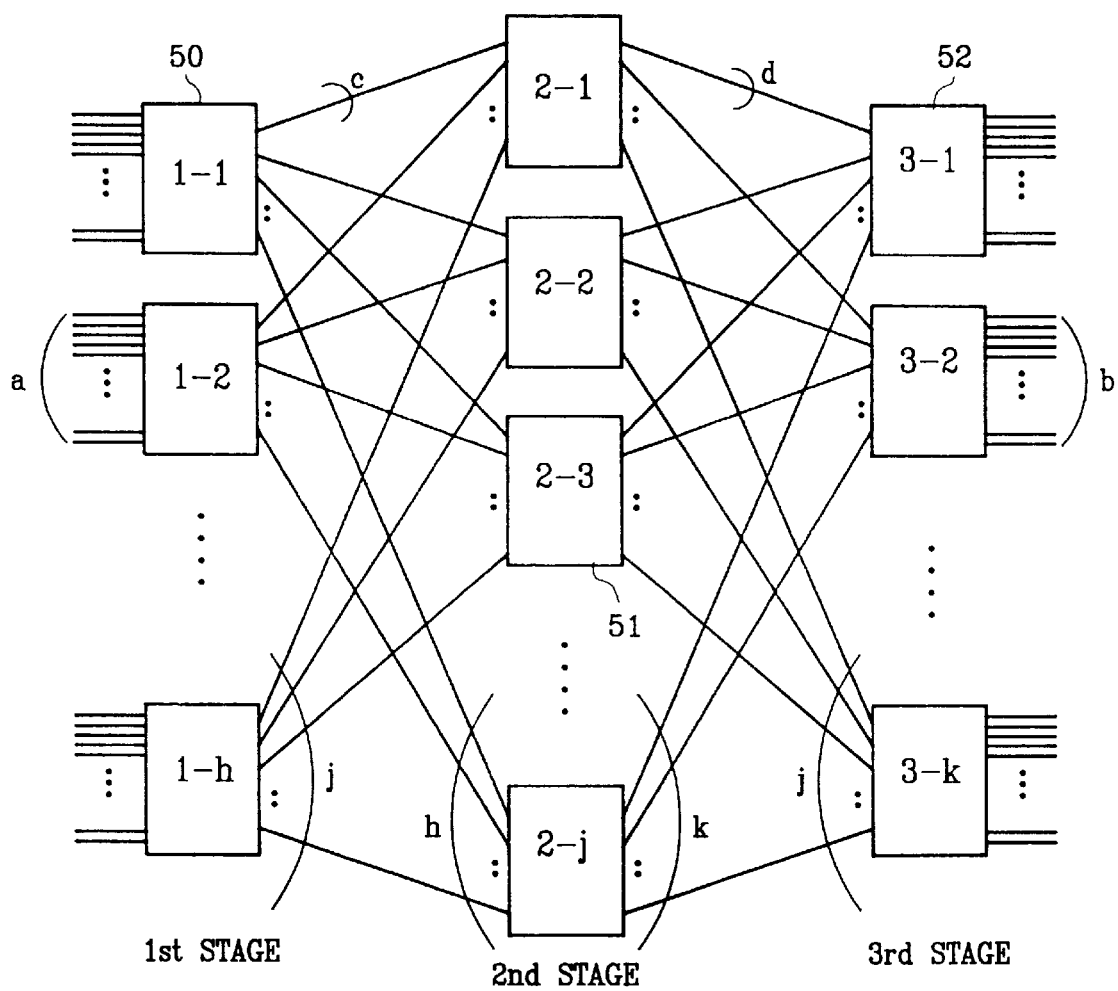
FIG. 12 is a diagram illustrating an extended switch system using a multi-channel switching function according to the present invention.

FIG. 12 illustrates an extension switch structure of a Clos network which is most general in the multi-stage network.

This method is adapted to an extension switch structure having a multi-stage network such as a Banyan type, a Flip type, an Omega type, etc., not the Clos type network.

The capacity of the unit switch as shown in FIG. 12 is as follows.

The unit switch of the first stage is a x (c x j), and the unit switch of the second stage is (c x h) x (d x k), and the unit switch of the third stage is (d x j) x b.

Therefore, the entire unit switch capacity is obtained by (a x h) x (b x k). The output link of the unit switch 50 of the first stage is grouped into the c-number of the link. In addition, the each c-number of the output link group is connected with the unit switches 51 of the second stage.

In addition, the output link of the unit switch 51 of the second stage is grouped into the unit switch 52 of the third stage.

In the present invention, one of the important elements is connected to the stage, so that it is possible to implement a multi-channel switching function by the channel grouping.

If the switch structure is configured by a single channel switching method for a connection between stages as shown in FIG. 12, the input unit switch of the first stage checks the bandwidth with respect to the (c x j) number of the links so that the controller which manages the connection setting of the system searches an optimum switch searches an optimum path (namely, the path which the bandwidth can provide) whenever the connection setting is requested, and since the bandwidth with respect to the link as much as "d" for every unit switch of the second stage connected with the link must be checked. Therefore, the bandwidth as many as the (c x j) x (d x j) number must be checked. Namely, the system controller must checks a lot number of bandwidth for one connection setting, and the table is made bigger for managing many bandwidth, and the management process becomes complex.

Therefore, when processing a plurality of links of one stage as one group, the unit switch of the first stage checks the total band width based on the j-number of groups, and the unit switch of the second stage checks the total bandwidth of the group of the channel (consisting of the d-number of the channels as one group) connected with the unit switch of the corresponding destination (namely, the unit switch of the third stage). Finally, the total (j x k)number of the bandwidth checks are performed with respect to the first stage and the second stage.

Therefore, it is possible to improve the speed of the system controller, and it is possible to more economically configure the system in cooperation with the reduced size of the table.

Generally, since the ATM traffic has a high burstness of the cell attribute, eventhough the average traffic is less, a peak rate traffic is high, so that the peak rate traffic of one link exceeds the bandwidth that the link can provide, for thus causing a cell loss.

Therefore, in case of the multi-channel, since it is possible to use the total bandwidth of the entire links of the group, a sufficient bandwidth can be obtained in accordance with the traffic variation, so that it is possible to improve the cell loss characteristic.

If the switch is used as an unit switch of the extension network for maintaining a cell sequence, since it is possible to maintain a cell sequence during the multi-channel switching of a single group, eventhough the cells connected to one group passes through another link in the identical group, the cell sequence maintains at the final output port identically to the input state, except for the delay incurred by the recirculation paths in the switch network.

As described above, the packet switching apparatus with multi-channel and multi-cast switching functions and a packet switching system using the same according to the present invention have the following advantages.

First, since the switch operation has a multi-channel switching function, it is possible to effectively adapt an input/output link which becomes an n-time the basic speed V of the switch port by using one switch network. In addition, since it is possible to dynamically assign the double number "n" from 1 to the total switch size "N", it is possible to adapt input/output links having different speed to one switching system, whereby it is possible to support various kinds of services of the system.

Second, since the multi-channel switching has an operation characteristic of the output buffer type, it is possible to provide a plurality of switch ports with respect to the input/output link which has a lower cell loss ratio compared to another port, whereby it is possible to improve the cell loss characteristic without a support, such as a traffic flow control, of another function of the system.

Third, it is possible to concurrently process a cell copy and a routing by using one network, so that it is not necessary to configure a table for setting a path between two networks when a routing network and a copy network are separately provided, for thus reducing the cost of the system, and the control operation of the system control software is performed at high speed and is made simpler.

Fourth, it is possible to eliminate a complex control operation for maintaining a cell sequence integrity which is required between service end points by providing a cell sequence integrity function in a switch network, for thus simplifying the construction of the end point system, and it is possible to eliminate an information element for a cell sequence integrity from a pay load part of the cell, for thus maximizing the information amount which can be transferred per time.

Fifth, it is possible to provide an extension switch structure of a multistage type by using a unit switch having a multi-channel switching operation and a cell sequence integrity characteristic. At this time, the links connected to the stage is recognized as one group unit, so that the bandwidth management is made easily, and since available total bandwidth are all used, it is possible to effectively adapt the burst characteristic of the traffic, for thus maximizing the cell processing capacity.

Sixth, since a 2×2 simple switch device and a crossbar type network are basically used for the construction of the switch, it is possible to perform a routing operation of a pattern which is required for a device when integrating the switch by using a column and a row, so that the pattern routing in the integration device has a simpler structure, whereby it is possible to more easily develop the device.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A packet switching apparatus, comprising:

output group address generation means for providing an address information for each one of a plurality of individual output ports in a grouped output port;

routing means for receiving input cells comprising recirculated cells, which have been recirculated through a recirculation path, and newly inputted cells, each of said cells having a routing tag including a destination address data;

said routing means further comprising means for comparing said destination address data for each of said input cells to said address information output by said output group address generation means and assigning an output link to selected ones of said input cells when said destination address data is identical to said address information, with preference given to recirculated cells, and outputting others of said input cells, which were not assigned said output link, through a plurality of bypass links;

said output links corresponding to said individual output ports;

recirculation path setting means for selecting an R-number of said others of said input cells from said bypass links and outputting said R-number of cells through said recirculation path, wherein said R-number comprises a number of cells which can be simultaneously transmitted through said recirculation path; and synchronization means for receiving said R-number of cells on said recirculation path, time-synchronizing said R-number of cells with a new group of newly input cells and outputting R-number of cells as said recirculated cells to said routing means.

2. The apparatus of claim 1, wherein said output group address generation means comprises an N-number of address transmission logic devices, said plurality of individual output ports comprising an N-number of individual output ports, an output port address transmitted from each of said N-number of address transmission logic devices comprises an N-number of bits and uses a bit addressing means having a predetermined interrelationship with an associated one of said N-number of output ports, said N-number of address transmission logic devices being operatively connected for transmitting identical address information to each of said N-number of output ports, and said address information from each of said N-number of address transmission logic devices being dynamically converted into a predetermined address information in accordance with said predetermined interrelationship.

3. The apparatus of claim 1, wherein at least one of said input cells includes said routing tag comprising a plurality of destination address information and said routing means further comprises:

means for comparing said plurality of destination address information with an output port address from the output group address generation means and outputting said one of said input cells to more than one of said plurality of individual output ports wherein each of said plurality of output ports is associated with said output port address that is identical to one of said plurality of destination address information; and multi-channel means for concurrently outputting a destined group comprising up to m input cells having the identical destination address, where m is within the range from 0 to N, and where N is the number of output ports and m is the size of the destined output group.

4. The apparatus of claim 1, wherein said routing means comprises a crossbar network having a plurality of switching devices arranged in rows and columns, said switching devices receiving said input cells from a plurality of input ports, one of said plurality of input ports connected with each row;

said switching device comprising means for comparing said address information for each one of a plurality of individual output ports connected with each column of said switching devices, respectively, with said destination address of each one of said input cells connected with each row of said switching devices, and assigning said output link with respect to said selected ones of said input cells when said address information for each one of a plurality of individual output ports connected with each column of said switching devices, respectively, is identical to said destination address of each one of said selected ones of said input cells, and said switching device further comprising means for outputting each of said selected ones of said input cells to said plurality of individual output ports through said assigned output link by correcting a destination address corresponding to an output link assigned from the destination address of a routing tag added to an input cell, outputting said input cells to said bypass link, recognizing said input cells from the bypass link as a null value when input cells therefrom are assigned said output links with respect to each of a plurality of said destination address information corresponding to a plurality of output ports, and changing said destination address information with respect to the output port when there remains an output port in said destination address information which was not assigned said output link for outputting said input cells to the bypass link with only said destination address information which was not assigned said output link.

5. The apparatus of claim 3, wherein said routing means includes a crossbar network having a plurality of switching devices arranged in rows and columns, said switching devices receiving said input cells from a plurality of input ports connected with each row;

said switching device comprising means for comparing said address information for each one of a plurality of individual output ports connected with each column of said switching devices, respectively, with said destination address of each one of said input cells connected with each row of said switching devices, and assigning said output link with respect to said selected ones of said input cells when said address information for each one of a plurality of individual output ports connected with each column of said switching devices, respectively, is identical to said destination address of each one of said selected ones of said input cells, and said switching device further comprising means for outputting each of said selected ones of said input cells to said plurality of individual output ports through said assigned output link by correcting a destination address corresponding to an output link assigned from the destination address of a routing tag added to an input cell, outputting said input cells to said bypass link, recognizing said input cells from the bypass link as a null value when input cells therefrom are assigned said output links with respect to each of a plurality of said destination address information corresponding to a plurality of output ports, and changing said destination address information with respect to the output port when there remains an output port in said destination address information which was not assigned said output link for outputting said input cells to the bypass link with only said destination address information which was not assigned said output link.

6. The apparatus of claim 4, wherein said plurality of switching devices comprises:

means for receiving said address information from the output group address generation means;

means for setting a connection identification value as a predetermined value when a path is not set in an upper row of said switching devices and a destination address of the cell inputted and the output port address are identical;

means for setting a path setting state as a predetermined value;

means for outputting said path setting state to a lower row of said switching devices;

means for correcting a routing tag of the cell inputted;

means for outputting the corrected routing tag to the switching device of the next column of said switching devices; and means for outputting said path setting state information and said routing tag of said input cell when a path is set in the switching device of the upper row, or when said destination address of said input cell and said address information are not identical.

7. The apparatus of claim 1, wherein said recirculation path setting means comprises:

an assigned cell flag generation means for setting a flag to a first value when said routing tag value of said input cell is a null value, and for setting the flag to a second value when said destination address information is set in said routing tag of said input cell; and a recirculation path comparison means which does not set a recirculation output link when the flag from the assigned cell flag generation means equals said first value, and sets the recirculation output link when said flag equals said second value and said output link is not set in an upper row of said routing means.

8. The apparatus of claim 7, wherein said recirculation path comparison means includes:

a crossbar network type configured by using a plurality of switching devices arranged in an N×M array of columns and rows, respectively; and means for receiving from the assigned cell flag generation means from a leftward direction of each row, the rightward end portion of the row is connected with the recirculation path, the total number of rows is an integer M where M equals the sum of N, the number of input ports of the switch, and R, the number of recirculation paths, wherein in said switch device of each row and column, when said flag from said assigned cell flag generation means is the second value, said recirculation link is assigned when the corresponding recirculation link was not set in one of said switching devices of an upper row, said path setting state information is changed, and is outputted to said switching device of a lower one of said rows, said flag value is changed to said first value, and is outputted to said switching device of a next one of said columns.

9. The apparatus of claim 8, wherein said recirculation cells are inputted into an input port associated with upper ones of said routing means, and said newly inputted cells are inputted into input ports associated with lower ones of said rows of said routing means, such that said recirculated cells are assigned to output links with a higher priority than that of said newly arrived cells at the input.

10. A packet switching system, comprising:

a plurality of input ports;

a plurality of output ports:

a switch network connected to said plurality of input ports and said plurality of output ports having a predetermined speed, wherein said plurality of input ports have a first predetermined speed and a maximum output speed; an output port exceeding said predetermined speed;

a time division multiplexing means for providing an even service time with respect to each one of said input ports is operatively connected to said plurality of output ports, one of said plurality of input ports having a second predetermined speed exceeding said predetermined speed of the switch network; and said time division demultiplexing means having an even characteristic of a service time with respect to each one of said plurality of output ports is also operatively connected to said plurality of input ports;

said switch network, comprising:

output group address generation means for providing an address information for a grouped output port;

routing means for receiving input cells which comprise recirculated cells inputted through a recirculation path and newly inputted cells, assigning an output link to each of said input cells when said output port address of the output link from the output group address generation means matches a destination address in the routing tag of said input cell, with preference given to recirculated cells, and outputting said input cells which were not assigned onr of said output links through a plurality of bypass links;

recirculation path setting means for selecting an R-number of said input cells in said bypass links and for outputting the selected input cells to said recirculation path; and synchronizing means for receiving said input cells from said recirculation path, synchronizing the recirculated input cells and a new set of newly inputted cells, and outputting the recirculated input cells to said routing means, for thus performing a switching function with respect to the input/output link wherein the input/output speed exceeds a predetermined speed.

11. A packet switching system, comprising:

a plurality of switch networks for performing unit switching functions;

a multi-stage connection network using said plurality of switch networks;

a plurality of connection link s between unit switches of one group;

a logic group for assigning an identical address with respect to a plurality of output links of the unit switch of a front point, for thus forming one logic group, wherein a plurality of input cells outputted from the unit switch through one input link are outputted to one of output links at every cell transmission time and then are inputted into the unit switch of an end point, said multi-stage connection network, comprising:

output group address generation means for providing an address information for a grouped output port;

routing means for receiving input cells comprising recirculated cells inputted through a recirculation path and newly inputted cells, assigning an output link to each of said input cells which has a destination address in a routing tag of said input cell matching the output port address of the output link from the output group address generation means with preference given to recirculated cells, and outputting the input cells which were not assigned one of said output links through a plurality of bypass links;

recirculation path setting means for selecting R-number of said input cells in said bypass links, said R-number being the maximum number of cells allowed in said recirculation path and for outputting said R-number of cells through said recirculation path; and synchronizing means for receiving a recirculated one of said R-number of cells from said recirculation path, synchronizing said recirculated input cells with a new set of newly inputted cells, and outputting said recirculated input cells to said routing means.

* * * * *